Jan. 27, 1970     E. A. J. MARCATILI     3,492,485

AUTOMATIC BEAM REFOCUSER FOR BEAM WAVEGUIDES

Filed Nov. 2, 1967     2 Sheets-Sheet 1

INVENTOR
E. A. J. MARCATILI
BY
*Lyman Sherman*
ATTORNEY

Jan. 27, 1970     E. A. J. MARCATILI     3,492,485

AUTOMATIC BEAM REFOCUSER FOR BEAM WAVEGUIDES

Filed Nov. 2, 1967     2 Sheets-Sheet 2

United States Patent Office 3,492,485
Patented Jan. 27, 1970

3,492,485
AUTOMATIC BEAM REFOCUSER FOR
BEAM WAVEGUIDES
Enrique A. J. Marcatili, Rumson, N.J., assignor to Bell
Telephone Laboratories, Incorporated, Murray Hill,
N.J., a corporation of New York
Filed Nov. 2, 1967, Ser. No. 680,214
Int. Cl. G01j 1/20; H01j 39/12
U.S. Cl. 250—201                               8 Claims

ABSTRACT OF THE DISCLOSURE

The distortion experienced by a beam propagating through a sequence of aberrant lenses is described, and means are disclosed for correcting beam distortion due to second order mode conversion effects. Such means include locating sensor elements at selected points along the wavepath to measure the beam width, and automatically refocusing the beam in a manner to minimize changes in beam width. Refocusing is done either by repositioning lenses or by changing their focal lengths. The invention is applicable to both gaseous lenses, solid lenses and periscopic mirrors.

---

This invention relates to automatic refocusing arrangements for use in electromagnetic wave guidance systems and, in particular, for use in optical systems for guiding infrared, visible and ultraviolet beams.

Background of the invention

Correlated and uncorrelated transverse displacements of the lenses of a beam waveguide cause a propagating beam to deviate from the axis of the waveguide. Since the deviation can grow in proportion to the number of lenses, the tolerance requirements on the lens alignment becomes increasingly severe as the number of lenses are increased and as the lens-to-lens spacing is reduced.

In an article entitled "Ray Propagation in Beam-Waveguides with Redirectors," published by applicant in the January 1966 issue of the Bell System Technical Journal, circuit arrangements are proposed that sense the position of the beam and automatically redirect it along the guide axis.

As long as the lenses are "perfect," lens misalignment only affects the beam direction, without altering the normal mode beam size or the beam intensity profile. If, on the other hand, the lenses have aberrations, the beam profile is not conserved. Instead, the beam becomes progressively more deformed as it travels along the guide. The definition of the beam axis becomes fuzzy and, as a result, the redirectors become less and less effective. Eventually, the grossly distorted beam is directed out of the guiding lenses and is rendered useless.

The normal mode propagated along a distortionless waveguide is characterized by a Gaussian intensity profile. Due to the presence of lens aberrations a portion of this wave energy is converted to other, higher order modes. Many applications, however, such as heterodyning of optical beams, requires that the distortion resulting from the presence of these higher order modes be minimized either by corrective means which reconverts the energy to the desired normal mode, or by filtering means which removes the high order modes. Filtering, however, is a dissipative process and, hence, represents a loss to the system. Accordingly, which of these two processes is employed in any particular system as a means of eliminating the deleterious effects of lens aberrations, represents a compromise between circuit complexity and cost on one hand, and transmission efficiency on the other hand.

As will be explained hereinbelow, techniques presently exist for correcting beam distortion due to first order mode conversion. The present invention relates to arrangements for correcting beam distortion due to second order mode distortion.

Summary of the invention

In accordance with the present invention, beam distortion due to second order mode conversion is corrected by means of automatic refocusers distributed along the wavepath.

Beam distortion due to the presence of higher order modes can be minimized by means of more complicated servo control systems. However, in a high quality transmission system, distortion due to higher order modes is typically very small and may be advantageously corrected by means of absorption filters.

In the illustrative embodiment of the invention to be described, each refocuser circuit includes three longitudinally-spaced photosensitive elements, located between a pair of adjacent lenses for sensing the beam width at three different positions between the lenses. First and second differential amplifiers measure the difference between the signals derived from pairs of photosensitive elements, and generate two error signals. These are then fed back along the wavepath to a second pair of lenses in a manner to refocus the beam and, thereby minimize each of the error signals.

It is an advantage of the invention that the automatic refocusing arrangement described in no way interferes with the operation of the automatic beam redirectors described by applicant in the above-mentioned article. Thus, corrections due to lens aberrations and lens displacement can be independently and simultaneously applied.

These and other objects and advantages, the nature of the present invention, and its various features, will appear more fully upon consideration of the various illustrative embodiments now to be described in connection with the accompanying drawings.

Detailed description

For the purposes of the following discussion and explanation, the waveguiding systems described are regarded as two-dimensional structures. Obviously, however, systems are three-dimensional and, hence, influence the profile of the guided beam along two mutually perpendicular transverse directions. Accordingly, it is to be understood that the refocusing arrangements described hereinbelow must be provided to sense and control the beam width along two mutually-perpendicular directions.

Figure 1:
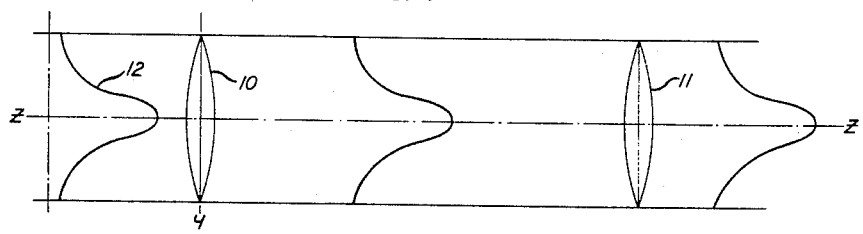
FIG. 1 shows a portion of a distortionless waveguiding system and the beam intensity profile at various locations along the waveguide.

Referring to the drawings, FIG. 1 shows a portion of a distortionless beam waveguiding system including two lenses 10 and 11. While illustrated as solid lenses, it is understood that other types of lenses, such as, for example, gaseous lenses, can be used in connection with the present invention.

If the lenses are properly aligned with respect to the guide axis z—z, and if the lenses are free of aberrations, an on-axis incident beam, having a Gaussian transverse field distribution remains on axis and preserves its Gaussian profile as it propagates past the two lenses. In particular, the beam width, which depends upon the initial conditions, the focal length of the lenses and their spacing, is independent of lens alignment and does not change as a function of the number of lenses. If, on the other hand, the lenses in the system have aberrations, high order modes are generated and, as a result, the beam axis is displaced, and the Gaussian profile is not conserved. In the following discussion, the effects of first and second order mode conversion on a Gaussian beam are considered separately in connection with FIGS. 2 and 3.

Figure 2:
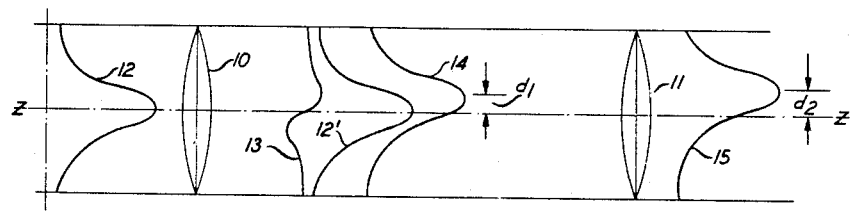
FIGS. 2 and 3 show the effects of first order and second order mode distortion upon a propagating beam.

FIG. 2 shows the effect of first order mode distortion on the fundamental beam mode due to lens aberrations. As in FIG. 1, an on-axis beam, having a Gaussian field distribution 12, is incident upon lens 10. However, in this second instance, due to lens aberrations, there is a small amount of mode conversion from the fundamental mode to the first higher order mode. Thus, after transversing lens 10, the beam includes both a fundamental mode component 12' and a small first order mode component 13. When added to the fundamental mode, the small first order component has the effect of transversely displacing the center of the beam a distance $d_1$ with respect to the guide axis, as shown by curve 14. The beam profile, however, remains essentially Gaussian and the beam width at each lens is unchanged.

Aberrations in lens 11, and other lenses in the system, also produce first order mode components which add, in proper phase, to the first order mode component induced by lens 10.

The resulting displacement of the beam due to first order mode conversion is no different than beam displacement due to lens misalignment, and can be corrected by means of beam redirectors of the type discussed in my above-mentioned article.

Figure 3:
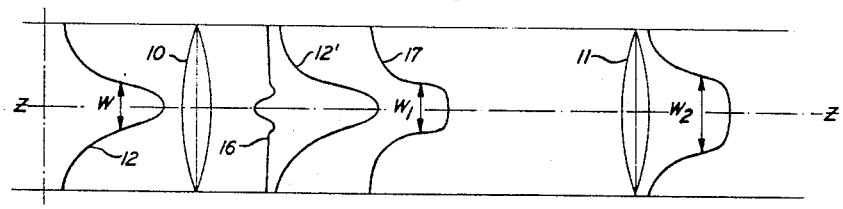

FIG. 3 illustrates the effect of second order mode conversion upon the beam intensity profile. In this figure an incident beam 12, propagating through lens 10, experiences a small amount of second order mode conversion represented by component 16. When added to the fundamental mode component 12', a somewhat broadened beam 17 results. Designating the incident beam width W, the broadened beam 17 has a width $W_1 > W$.

As the beam continues to propagate down the guide, it experiences further mode conversion at each lens in the system, producing additional second order mode components. These components add, in proper phase, and cause a change in beam width as it propagates along the wavepath.

While the effects of first and second order mode conversion have been considered separately, for purposes of explanation, both typically occur simultaneously at each lens. However, since the effects produced are distinctly different and are corrected by means of different techniques, the displacement effects produced as a result of first order mode conversion, and described in connection with FIG. 2, are not considered any further. Second order mode conversion and means for correcting the resulting change in beam width, however, are considered in connection with FIG. 4 which shows a portion of a beam waveguide including four lenses 40, 41, 42 and 43. As noted previously, though indicated as solid lenses, the lenses can be either solid lenses or gaseous lenses.

Figure 4:
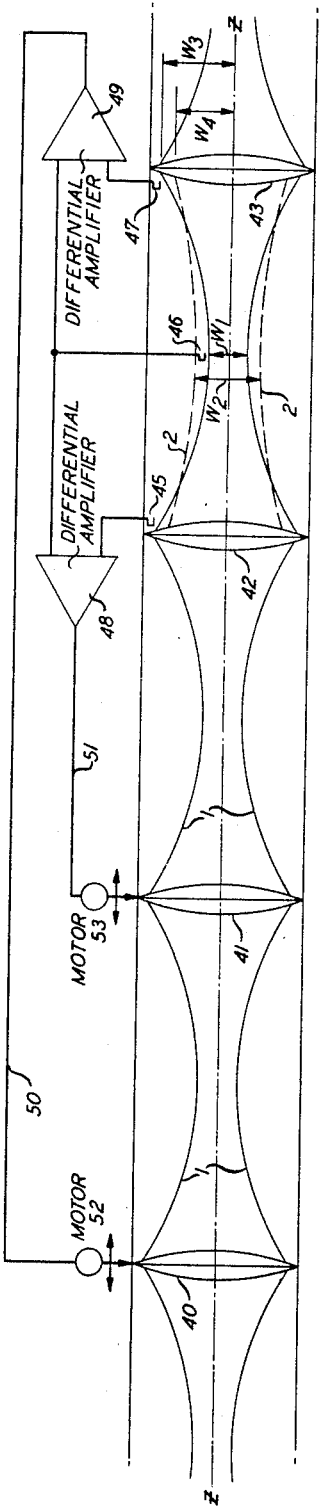
FIG. 4 shows a beam refocusing arrangement in accordance with the invention.

The variation in beam width as a function of location along the wavepath in an aberration-free lens system is indicated by curve 1. Typically, the beam is broadest at each lens and pinches down to a minimum halfway between lenses. Also shown schematically in FIG. 4 is an automatic refocusing circuit, in accordance with the invention, comprising beam-width sensors 45, 46 and 47; differential amplifiers 48 and 49; and feedback paths 50 and 51 for coupling the error signals generated in amplifiers 48 and 49 to a pair of motors 52 and 53. The motors reposition lenses 40 and 41, respectively, in accordance with the amplitude and polarity of the error signals.

Stated broadly, it is the function of the sensors to sense any change in beam width and to produce a corresponding change in signal in response thereto. Each of the differential amplifiers compares the signal changes produced by two of the sensors situated at two different locations along the wavepath. In particular, each amplifier generates an error signal which is a function of the difference between the two signals derived from a pair of sensors, and couples it back to one of two lens positions along the wavepath. Depending upon the nature of the lenses, the error signals operate either to change the focal length of the individual lenses, as in the case of gaseous lenses, or to change the longitudinal position of the lenses, as in the case of some types of solid lenses. In either arrangement, the changes are such as to minimize the error signals by refocusing the wave in a manner to restore the beam width to what it would be in the absence of any second order mode conversion.

Referring again to FIG. 4, the beam-width sensors 45, 46 and 47, are longitudinally distributed along the waveguide and positioned about the wavepath so as to sense any changes in beam width. Specifically, the signals associated with sensors 45 and 47 are coupled, respectively, to differential amplifiers 48 and 49, whereas the signal associated with sensor 46 is coupled to both amplifiers.

Differential amplifiers 48 and 49 can be any of the various types well known in the art. For a discussion of differential amplifiers see, for example, "RCA Linear Integrated Circuit Fundamentals" Technical Series IC-40, published in 1966 by the Radio Corporation of America.

In the absence of lens aberrations, the signals derived from the several sensors, and coupled to amplifiers 48 and 49, are such as to generate no net error signal in the output of either amplifier 48 and 49. If, however, there is a change in beam width, as indicated, for example, by the dashed curve 2 in FIG. 4, there is a corresponding change in the sensor signals. Specifically, for the beam width changes illustrated by curve 2, the signals derived from sensors 45 and 47 decrease, whereas the signal derived from sensor 46 increases.

For purposes of illustration, let us consider the simple case where the beam is the proper size at sensors 45 and 47, but is too broad at sensor 46. Using solid lenses, correction is made by moving lenses 40 and 41 towards each other until the beam size at sensor 46 is reduced to the correct width. If, on the other hand, the beam is too narrow at sensor 46, correction is obtained by increasing the spacing between lenses 40 and 41.

More complicated situations wherein the beam size is incorrect at two or at all three sensor positions are corrected by other combinations of lens displacements which follow from the basic displacements described above. In any event, the system is self-regulating and responds in a manner to minimize the error signals generated by amplifiers 48 and 49.

Figure 5:
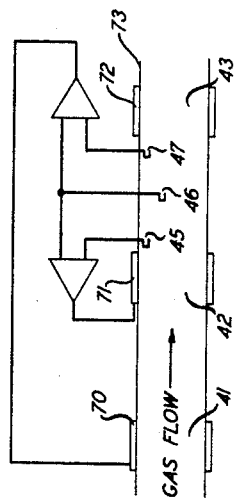
FIG. 5 shows an alternative refocusing arrangement wherein the focal lengths of the lenses are changed.

Since the beam width profile between pairs of lenses is a function of the lens-to-lens spacing, the distance between lenses 42 and 43 must remain constant. Hence, in a system in which refocusing is accomplished by repositioning the lenses, as explained above, refocusing cannot be accomplished by operating upon either lens 42 or 43. However, in a system in which the focal lengths of the lenses are changed, rather than their locations, there is no corresponding limitation. That is, beam refocusing can also be achieved by changing the focal lengths of lenses 40 and/or 41, or, alternatively, by changing the focal lengths of lenses 41 and/or 42. However, since it is advantageous to effect refocusing as close to the sensors as is feasible, in a gaseous lens system the error signals derived from differential amplifiers 48 and 49 are advantageously used to adjust lenses 41 and 42 rather than lenses 40 and 41. This alternative arrangement is shown in FIG. 5. In this illustrative embodiment, lenses 41, 42 and 43 are formed by locating heating elements 70, 71 and 72 on opposite sides of conduit 73, as described in greater detail in my copending application Ser. No. 487,677, filed Sept. 16, 1964, and assigned to applicant's assignee. Refocusing is achieved by changing the current through the heaters in response to changes in the sensor signals. For example, in the case where the beam is the proper size at sensors 45 and 47, but is too broad at sensor 46, the current in heater 71 increases, causing an increased temperature gradient in the gas, and a reduction in the focal length of lens 42. While there is also an initial tendency for the focal length of lens 41 to increase, this tendency is transient. For the conditions stated, there is no net change in the focal length of lens 41.

If, however, the beam width at two or at all three sensor positions is incorrect, the focal lengths of both lenses 41 and 42 are changed to effect the necessary corrections.

Figure 6:
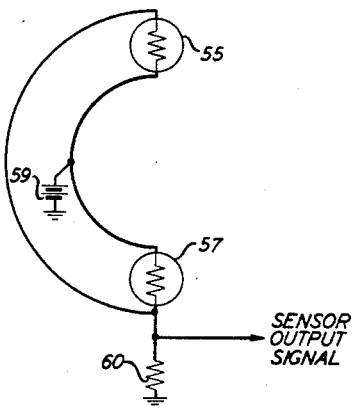
FIG. 6 shows the use of two sensors for determining changes in the beam width.

The specific type of sensors used in the above-described refocusing arrangements depends upon the frequency of the guided wave energy. In an optical system, for which the refocusing arrangements of FIGS. 4 and 5 are particularly adapted, photosensitive sensors, such as photocells or photoresistors, are typically used. While only one such photosensitive element need be employed at each sensor location, as indicated in FIGS. 4 and 5, an arrangement of two sensors 55 and 57, disposed as illustrated in FIG. 6 is advantageously used at each location. In this arrangement, the two photoresistors are symmetrically positioned on opposite sides of the wavepath. One terminal of each is connected to a common power source 59. The other terminal of each is connected to a common resistive load 60.

When the beam is properly aligned and focused, both the photoresistors are equally illuminated. The resulting currents through the two photoresistors, which are equal, flow through common resistor 60 to produce the output voltage for that particular sensor location. As the beam size varies for any reason, the illumination incident upon each photoresistor increases or decreases, causing a corresponding change in the current through each photoresistor and in the sensor output voltage.

It is an advantage of the arrangement of FIG. 6 that whereas it is sensitive to changes in beam width, it is relatively insensitive to changes in beam position. For example, if the beam is displaced upward, towards photoresistor 55, the current through it would increase. However, the current through the oppositely-located photoresistor 57 would decrease, tending to produce no net change in the total current through resistor 60.

The three sensor output signals produced at the three sensor locations are coupled to the respective differential amplifiers in pairs. That is, the sensor signal from each of two of the sensor locations is coupled, respectively, to one of the differential amplifiers, while the signal from the third sensor location is coupled to both amplifiers. It should be noted, however, that while the signal from sensor 46, in the embodiment of FIG. 4, is used as the common signal, this is merely by way of illustration. Alternatively, the signal from either of the other sensor locations 45 or 47 can just as readily be used as the common signal.

Figure 8:
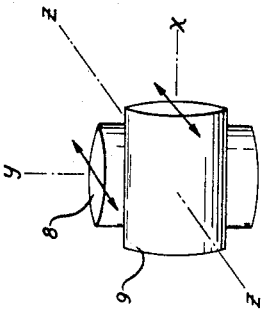
FIG. 8 shows a solid lens arrangement capable of independently refocusing a beam in two mutually-perpendicular directions.
Figure 7:
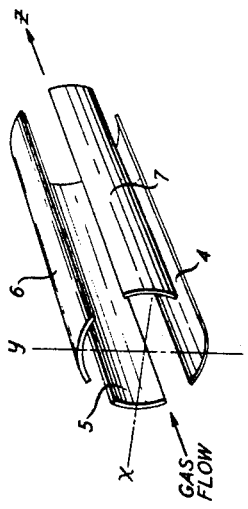
FIG. 7 shows a thermal gaseous lens capable of being independently focused along two, mutually independent directions.

As indicated hereinabove, a lens and a beam are three-dimensional rather than two-dimensional and, hence, the beam width must be monitored along two mutually-perpendicular directions and beam refocusing must be done along these two mutually-perpendicular directions. Accordingly, in practice each sensor location is provided with an x-direction sensor and a y-direction sensor, where x and y represent two mutually-perpendicular transverse directions. Similarly, x-direction and y-direction differential amplifiers are provided for independently controlling pair of lenses capable of refocusing the beam along both the x and y directions. FIGS. 7 and 8 are illustrative of lenses which can be used to practice the present invention.

FIG. 7 shows a thermal gaseous lens of the type described in my above-mentioned copending appplication Ser. No. 487,677, filed Sept. 16, 1964. In this lens the temperature control element is divided into four sections 4, 5, 6 and 7, thus providing means for separately controlling the temperature gradients along two perpendicular directions. Thus, in accordance with the present invention, the temperature of oppositely-located heating elements 4 and 6 is controlled by one of the y-direction differential amplifiers, whereas the temeperature of the other pair of heating elements 5 and 7 is controlled by one of the x-direction differential amplifiers. In this manner the focal lengths of the lens relative to an x component of the beam width and to a y component of the beam width are independently adjustable, thereby providing a means for separately refocusing the beam in two mutually-perpendicular directions.

FIG. 8 utilizes a pair of solid cylindrical lenses 8 and 9 as a means of independently refocusing the beam along two perpendicular directions. Lens 8, which is oriented with its axis along the y-direction, is used to refocus the beam in the x-direction, whereas lens 9, oriented with its axis along the x-direction, refocuses the beam in the y-direction. Refocusing, as explained hereinabove, is accomplished by physically repositioning each of the cylindrical lenses in accordance with the error signals generated by one of the x-direction and one of the y-direction differential amplifiers.

In the discussion above, the lenses were referred to as either solid lenses or gaseous lenses, and it was indicated that refocusing is accomplished either by repositioning the solid lenses or by changing the focal lengths of the gaseous lenses. It should be noted, however, that there are other types of lenses. One such other type, the so-called "periscopic mirror" described in United States Patent 3,224,330, issued Dec. 21, 1965, comprises a pair of curved reflectors. Since the focal length of such a lens depends upon the curvature of the reflectors, it is evident that refocusing, in accordance with the present invention, can be achieved by squeezing one or both of the reflectors along two mutually-perpendicular directions in a manner to change their curvature and, thereby, change the x-direction and y-direction focal lengths of the lens.

Thus, it is understood that the above-described arrangements are merely illustrative of but a small number of the many specific embodiments which can represent applications of the principles of the invention. Numerous and varied other arrangements can readily be devised in accordance with these principles by those skilled in the art without departing from the spirit and scope of the invention.

I claim:
1. In an electromagnetic beam waveguide including a plurality of lenses longitudinally spaced along said guide, automatic refocusing means comprising:
   sensing elements located at three longitudinally-spaced positions between an adjacent pair of said lenses for sensing the width of the beam propagating therealong;
   first and second means for generating first and second error signals in response to the signals derived from pairs of sensing elements; and
   means for coupling said error signals back to a second pair of lenses of said waveguide for refocusing said beam in response to said error signals.
2. Refocusing means in accordance with claim 1 wherein:
   said error signals change the focal lengths of said second pair of lenses.

3. Refocusing means in accordance with claim 1 wherein:
said error signals change the longitudinal locations of said second pair of lenses.

4. Refocusing means in accordance with claim 1 wherein:
the sensors at each position comprise a pair of sensing elements symmetrically located on opposite sides of said waveguide.

5. Refocusing means in accordance with claim 1 wherein:
said lenses are gaseous lenses.

6. Refocusing means in accordance with claim 1 wherein:
said beams are optical beams.

7. Refocusing means in accordance with claim 2 wherein:
said first pair of lenses and said second pair of lenses include one lens in common.

8. The beam waveguide in accordance with claim 1 including:
means for refocusing said beam along two mutually-perpendicular directions transverse to the direction of beam propagation.

References Cited

UNITED STATES PATENTS

| | | |
|---|---|---|
| 3,101,472 | 8/1963 | Goubau. |
| 3,302,120 | 1/1967 | Kluver. |
| 3,382,022 | 5/1968 | Fox. |
| 3,402,980 | 9/1968 | Hutson. |
| 3,423,593 | 1/1969 | Chinnoch _____ 250—201 X |
| 3,442,574 | 5/1969 | Marcatili _____ 350—179 |

OTHER REFERENCES

Ray Propagation in Beam-Waveguides With Redirectors by E. A. J. Marcatili, Bell System Technical Journal, vol. XLV, No. 1, January 1966, pp. 105 to 115.

JAMES W. LAWRENCE, Primary Examiner

C. R. CAMPBELL, Assistant Examiner

U.S. Cl. X.R.

250—208, 209, 210; 350—96, 179